United States Patent
Jahnke et al.

(10) Patent No.: US 9,869,148 B2
(45) Date of Patent: Jan. 16, 2018

(54) WELLSITE CONNECTOR WITH FLOATING SEAL MEMBER AND METHOD OF USING SAME

(71) Applicant: National Oilwell Varco, L.P., Houston, TX (US)

(72) Inventors: Douglas A. Jahnke, Houston, TX (US); Frank B. Springett, Spring, TX (US); Eric T. Ensley, Cypress, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 0 days.

(21) Appl. No.: 14/390,763

(22) PCT Filed: Apr. 4, 2013

(86) PCT No.: PCT/US2013/035280
§ 371 (c)(1),
(2) Date: Oct. 3, 2014

(87) PCT Pub. No.: WO2013/152195
PCT Pub. Date: Oct. 10, 2013

(65) Prior Publication Data
US 2015/0083430 A1 Mar. 26, 2015

Related U.S. Application Data

(60) Provisional application No. 61/620,514, filed on Apr. 5, 2012, provisional application No. 61/623,020, filed on Apr. 11, 2012.

(51) Int. Cl.
*E21B 33/038* (2006.01)
*F16L 37/00* (2006.01)
(Continued)

(52) U.S. Cl.
CPC ............ *E21B 33/038* (2013.01); *E21B 33/03* (2013.01); *F16L 37/002* (2013.01); *F16L 37/62* (2013.01)

(58) Field of Classification Search
CPC ...... E21B 33/038; E21B 33/03; E16L 37/002; E16L 37/62
(Continued)

(56) References Cited

U.S. PATENT DOCUMENTS 2,609,836 A 9/1952 Knox
3,084,898 A 4/1963 Miller
(Continued)

FOREIGN PATENT DOCUMENTS

CN 101806199 8/2010
CN 202064876 12/2011
(Continued)

OTHER PUBLICATIONS

Akers, T.J., et al., "Formation and Removal of Hydrates inside wellhead connectors", SPE 124409, SPE Annual Technical Conference and Exhibition held in New Orleans, Oct. 1, 2009, 15 pages.
(Continued)

*Primary Examiner* — Matthew R Buck
*Assistant Examiner* — Patrick F Lambe
(74) *Attorney, Agent, or Firm* — Conley Rose, P.C.

(57) ABSTRACT

A wellsite connector for connecting components of a wellsite is provided. The wellsite has a wellbore extending into a subsurface formation. The wellsite connector includes a connector body and a floatable seal. The connector body has an end adapted for coupling to a first of the components, a pocket along an inner surface thereof, and a cavity adapted to receive a second of the components. The floatable seal member includes a seal ring having a hole therethrough to sealingly receive the second of the components. The seal
(Continued)

member is slidably movable in the pocket of the connector body transversely to an axis of the connector body whereby the second of the components is alignable to the first of the components for connection therebetween.

28 Claims, 11 Drawing Sheets

(51) Int. Cl.
 *F16L 37/62* (2006.01)
 *E21B 33/03* (2006.01)
(58) Field of Classification Search
 USPC .......................................................... 166/338
 See application file for complete search history.

(56) References Cited

U.S. PATENT DOCUMENTS

| | | | |
|---|---|---|---|
| 3,485,051 A | 12/1969 | Watkins | |
| 3,667,721 A | 6/1972 | Vujasinovic | |
| 4,310,139 A | 1/1982 | Williams, III et al. | |
| 4,431,215 A | 2/1984 | Moyer | |
| 4,479,506 A | 10/1984 | Goans | |
| 4,557,508 A | 12/1985 | Walker | |
| 4,606,555 A | 8/1986 | Adams | |
| 4,606,557 A | 8/1986 | Coffey | |
| 4,630,680 A | 12/1986 | Elkins | |
| 4,709,726 A | 1/1987 | Fitzgibbons | |
| 4,708,376 A | 11/1987 | Jennings et al. | |
| 4,902,044 A | 2/1990 | Williams et al. | |
| 4,904,228 A | 2/1990 | Frear et al. | |
| 4,993,755 A | 2/1991 | Johnston | |
| 5,116,017 A | 5/1992 | Granger et al. | |
| 5,178,215 A | 1/1993 | Yenulis et al. | |
| 5,305,838 A | 4/1994 | Pauc | |
| 5,332,043 A | 7/1994 | Ferguson | |
| 5,507,467 A | 4/1996 | Mott | |
| 5,588,491 A | 12/1996 | Brugman et al. | |
| 5,662,171 A | 9/1997 | Brugman et al. | |
| 5,971,076 A * | 10/1999 | Taylor ................. | E21B 33/038 166/368 |
| 6,016,880 A | 1/2000 | Hall et al. | |
| 6,089,321 A | 7/2000 | Morrill | |
| 6,129,149 A | 10/2000 | Beall | |
| 6,540,024 B2 * | 4/2003 | Pallini .................. | E21B 33/038 166/347 |
| 6,609,572 B1 | 8/2003 | Anderson et al. | |
| 6,923,476 B2 * | 8/2005 | Smith .................... | F16L 17/02 251/149.7 |
| 6,966,382 B2 | 11/2005 | Buckle et al. | |
| 7,367,396 B2 | 5/2008 | Springett et al. | |
| 7,614,453 B2 | 11/2009 | Spiering et al. | |
| 7,779,918 B2 | 8/2010 | Cowie et al. | |
| 7,814,979 B2 | 10/2010 | Springett et al. | |
| 8,016,042 B2 | 9/2011 | Spiering et al. | |
| 9,169,710 B2 | 10/2015 | Jahnke | |
| 2003/0106693 A1 | 6/2003 | Jennings et al. | |
| 2003/0101254 A1 | 8/2003 | Baugh | |
| 2004/0102069 A1 | 5/2004 | Singeetham et al. | |
| 2005/0034870 A1 | 2/2005 | Buckle et al. | |
| 2005/0057040 A1 | 3/2005 | Smith, III | |
| 2005/0269102 A1 | 12/2005 | McCanna et al. | |
| 2006/0197339 A1 | 9/2006 | Oestergaard et al. | |
| 2008/0203672 A1 | 8/2008 | Smith | |
| 2009/0014184 A1 | 1/2009 | Voss et al. | |
| 2010/0006298 A1 | 1/2010 | Voss et al. | |
| 2010/0078174 A1 | 4/2010 | Spiering et al. | |
| 2010/0155074 A1 | 6/2010 | Rodriguez | |
| 2011/0000670 A1 | 1/2011 | Springett et al. | |
| 2013/0175055 A1 | 7/2013 | Hart et al. | |
| 2013/0199801 A1 | 8/2013 | Johnson et al. | |
| 2013/0199802 A1 | 8/2013 | Weir et al. | |
| 2013/0264070 A1 | 10/2013 | Miller et al. | |
| 2014/0318809 A1 | 10/2014 | Joensen et al. | |

FOREIGN PATENT DOCUMENTS

| | | |
|---|---|---|
| GB | 2112432 | 7/1983 |
| GB | 2406151 | 3/2005 |
| WO | 2005108739 | 11/2005 |
| WO | 2013098560 | 7/2013 |
| WO | 2013152233 | 10/2013 |

OTHER PUBLICATIONS

Cameron: Drilling Systems—DL Annular Blowout Preventer, product specifications, [online], [retrieved on Nov. 8, 2011]. Retrieved from the Internet: <URL: http://www.c-a-m.com/forms/Product.aspx?prodID=ecd6ef4e-19dc-4ea-ad47-94689e36b61c>.
Cooper Cameron Corporation, Cameron Division product brochure "Collect Connector Comparison" (Jun. 1999) 8 pages.
Dril-Quip, Inc. product brochure "DX Series Subsea Connectors" (2008) 8 pages.
Examination Report for EPO Patent Application No. 13705052.2 dated Oct. 10, 2014, 2 pages.
GE Oil & Gas product brochure "Hydril Pressure Control Annu-Flec TM" (2010) 2 pages.
GE Oil & Gas product brochure "Hydril Pressure Control GK Annular Blowout Preventer" (2010) 2 pages.
GE Oil & Gas product brochure Hydril Pressure Control GL Annular Blowout Preventer (2010) 2 pages.
GE Oil & Gas product brochure "Hydril Pressure Control GX Annular Blowout Preventer" (2010) 2 pages.
GE Oil & Gas product brochure "VetcoGray Subsea Wellhead Systems" (2009) 12 pages.
GE Oil & Gas: Hydril Pressure Control Annu-Flex, product specifications, [online], [retrieved on Nov. 8, 2011]. Retrieved from the Internet: <URL: http://hydrilpressurecontrol.com/_pdf/pressureControlBrochures/GE_HY_Annu-Flex_FS_080610.pdf>.
Intergrated Equipment: Products: Elastomer Products—Annular BOP Seal Kits, product specifications, [online], [retrieved on Jan. 8, 2011]. Retrieved from the Internet: <URL: http://intergratedequipment.com/annular_bop_sealkits.asp>.
International Preliminary Report on Patentability and Written Opinion for PCT/US2013/023671 dated Aug. 5, 2014, 7 pages.
International Premliminary Report on Patentability and Written Opinion for PCT Application No. PCT/US2013/035269 dated Oct. 7, 2014, 9 pages.
International Preliminary Report on Patentability and Written Opinion for PCT Patent Application No. PCT/US2013/035280 dated Oct. 9, 2014, 9 pages.
International Search Report for PCT Patent Application No. PCT/US2013/023671 dated Feb. 26, 2014, 5 pages.
International Search Report for PCT Patent Application No. PCT/US2013/035269 dated Mar. 28, 2014, 5 pages.
International Search Report for PCT Patent Application No. PCT/US2013/035280 dated Mar. 28, 2014, 4 pages.
International Search Report for PCT Patent Application No. PCT/US2013/035332 dated Jun. 2, 2014, 7 pages.
Invitation to Pay Additional Fees and, Where Applicable, Protest Fee for PCT Patent Application No. PCT/US2013/035332 dated Mar. 28, 2014, 5 pages.
T3 Energy Services product brochure "7022 Annular BOP" (date unknown but prior to the date of this application), 1 page.
T3 Energy Services product brochure "7072 Annular BOPS" (date unknown but prior to the date of this application), 1 page.
T3 Energy Services product brochure "7872 Annular BOPS" (date unknown but prior to the date of this application), 1 page.
VetcoGray product brochure "H-4 Subsea Connectors" (2008) 7 pages.
Wikipedia (online encyclopedia) [online], Blowout Preventer, [retrieved Jan. 8, 2011]. Retrieved from the Internet: <URL: http://en.wikipedia.org/wiki/Blowout_preventer>.
Invitation to Respond to Written Opinion dated Feb. 11, 2016 including Search Report, and Written Opinion for Singapore Patent Application No. 11201406313Q dated Jan. 28, 2016, 11 pages.

(56) References Cited

OTHER PUBLICATIONS

Chinese First Office Action dated Jun. 28, 2016 for Chinese Application No. 213800296343, 24 pages (14 pages of English translation of Office Action and 10 pages in Chinese).
Chinese Patent Application No. 2013800296343 Office Action dated Mar. 1, 2017 (23 pages).

* cited by examiner

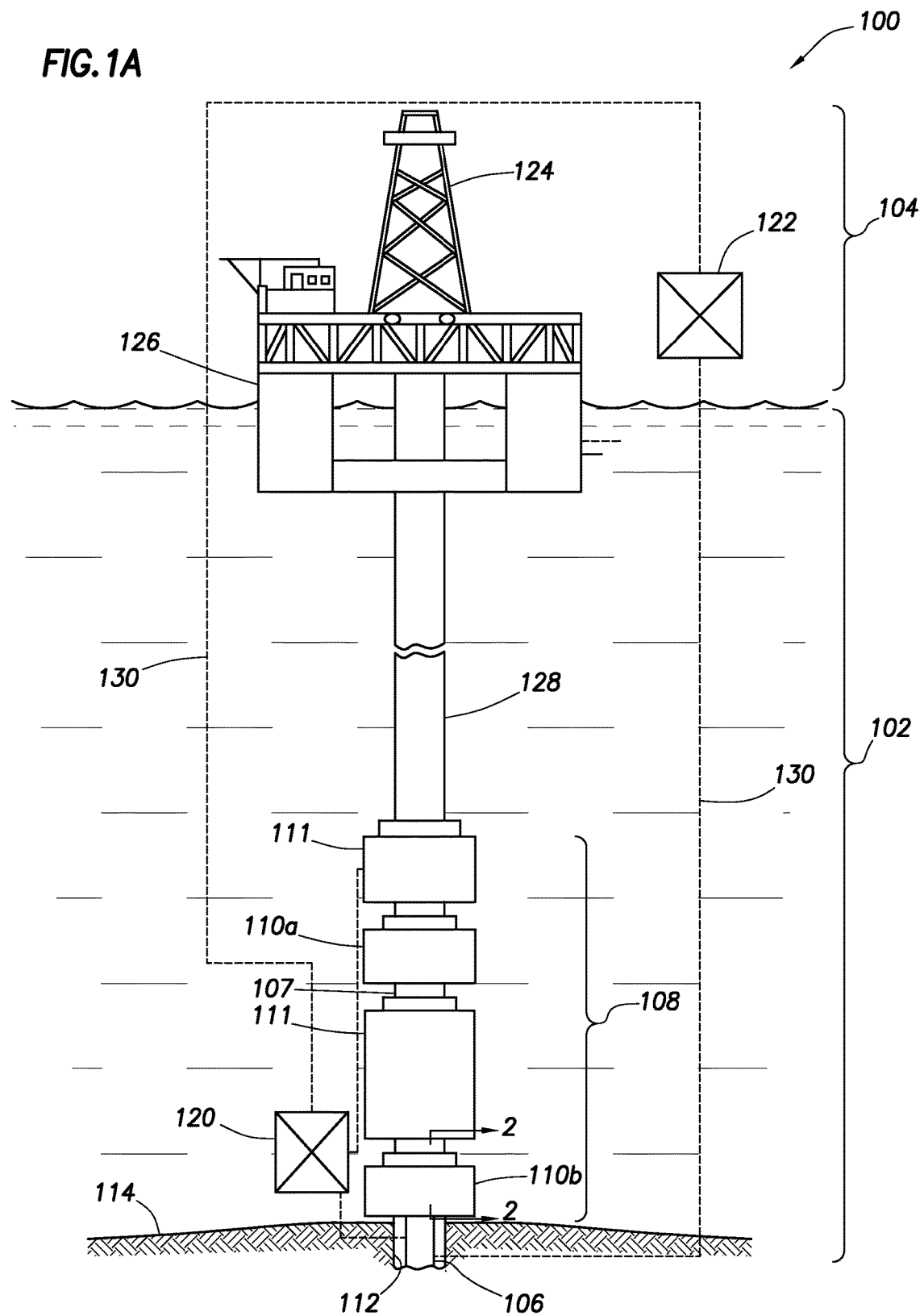

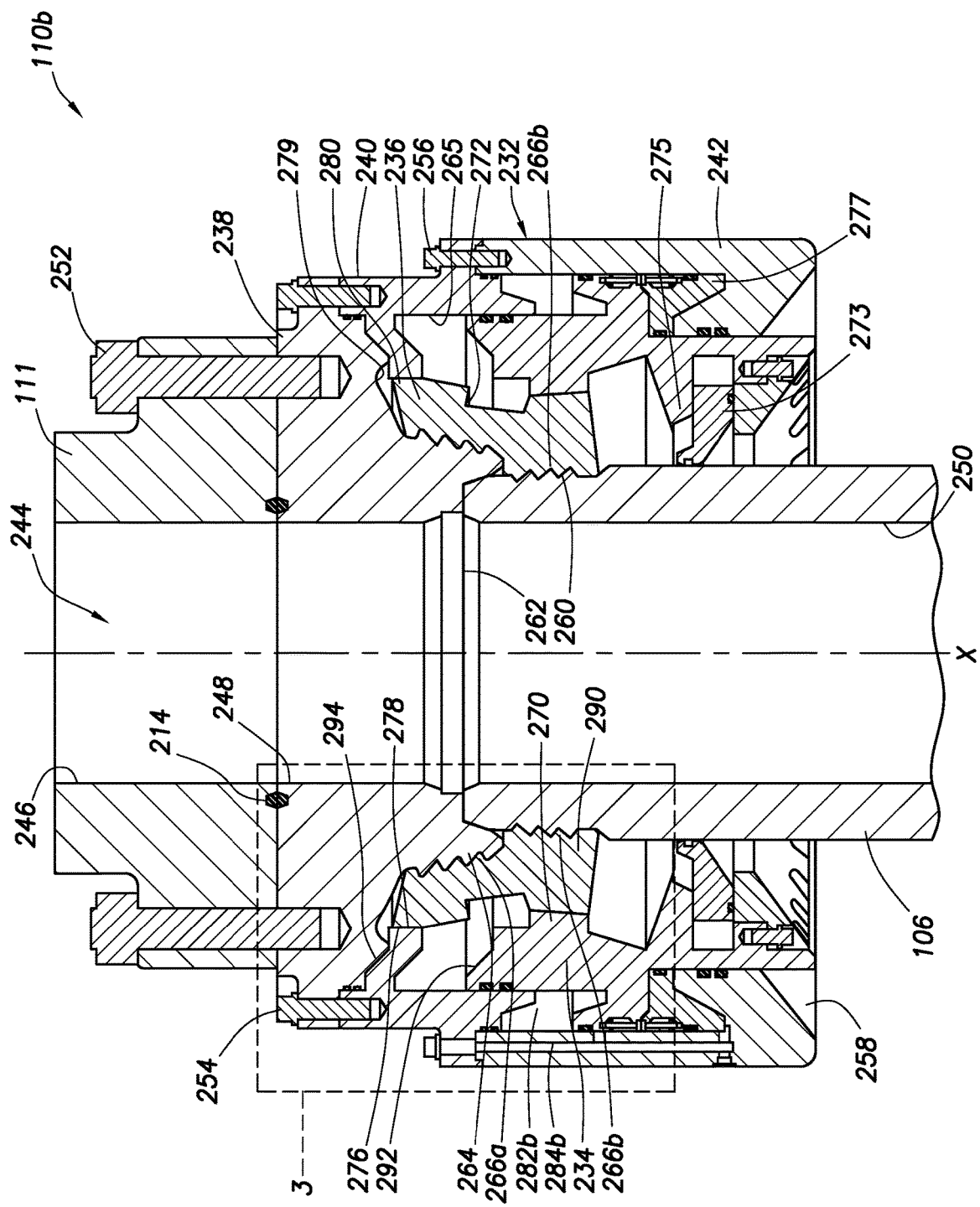

WELLSITE CONNECTOR WITH FLOATING SEAL MEMBER AND METHOD OF USING SAME

CROSS-REFERENCE TO RELATED APPLICATION

This application claims the benefit of U.S. Provisional Application No. 61/620,514, filed on Apr. 5, 2012 and U.S. Provisional Application No. 61/623,020, filed Apr. 11, 2012, the entire contents of which are hereby incorporated by reference.

BACKGROUND

This present disclosure relates generally to connectors used in wellsite operations. More specifically, the present disclosure relates to wellsite connectors, such as wellhead and/or subsea connectors, for connecting wellsite components.

Various oilfield operations may be performed to locate and gather valuable downhole fluids. Oil rigs are positioned at wellsites, and downhole tools, such as drilling tools, are deployed into the ground to reach subsurface reservoirs. Once the downhole tools form a wellbore (or borehole) to reach a desired reservoir, casings may be cemented into place within the wellbore, and the wellbore completed to initiate production of fluids from the reservoir. Tubulars (or tubular strings) may be provided for passing subsurface fluids to the surface.

A wellhead may be provided about a top of the wellbore for supporting casings and/or tubulars in the wellbore. A wellhead connector may be provided for connecting the wellhead to surface components, such as a blowout preventer (BOP) and/or a Christmas tree. In some wells, a tubular wellhead is located at the sea floor. During drilling operations, a riser extends from a vessel at the surface down to the wellhead. A wellhead connector connects the lower end of the riser to the wellhead. A wellhead connector may also be used to connect a subsea production tree to the wellhead.

Connectors may be used in subsea applications. Subsea connectors are used to join subsea devices in a subsea stack. If gas from the seabed migrates into a subsea connector, under the right conditions, the gas can form hydrates, which are solids of hydrocarbon gases and water, inside the connector. The hydrates may build up in the connector and interfere with operation of the latching mechanism of the connector. To avoid or control hydrate buildup in the connector, a hydrate seal may be used to prevent or control migration of gas into the connector. Some examples of connectors are provided in U.S. Pat. Nos. 4,557,508; 8,016, 042; 7,614,453; 4,902,044; 2010/0006298; 4,606,555; 4,606,555 and 5,332,043.

SUMMARY

In at least one aspect, the techniques herein may relate to a wellsite connector for connecting components of a wellsite. The wellsite has a wellbore extending into a subsurface formation. The wellsite connector includes a connector body and a floatable seal. The connector body has an end adapted for coupling to a first of the components, a pocket along an inner surface thereof, and a cavity adapted to receive a second of the components. The floatable seal member includes a seal ring having a hole therethrough to sealingly receive the second of the components. The seal member is slidably movable in the pocket of the connector body transversely to an axis of the connector body whereby the second of the components is alignable to the first of the components for connection therebetween.

The floatable seal member includes a lip extending from the seal ring. The lip has a seal ring face sealingly engageable with the second of the components. The floatable seal member has top and bottom seal ring surfaces supported by top and bottom walls of the pocket. The seal member comprises one of an elastomeric material, a metal material and combinations thereof. The wellsite connector may also include at least one seal element. The one seal element is positionable in a cavity of the seal member.

The may also include a piston axially movable in the connector body. The piston has a piston profile along an inner surface thereof. The pocket extends into an inner surface of the piston. The wellsite connector may also include a plurality of collets positionable about the connector body adjacent the piston and radially movable thereabout. The collets have a collet profile along an outer surface thereof corresponding to the piston profile of the piston and the plurality of collets have a grip profile along an inner surface thereof selectively engageable with the second of the components whereby the collets are selectively latchable about the second of the components.

The connector body may also include a cover operatively connectable to the first component and a sub having a hole therethrough to receive the second of the components. The cover has a cover location thereon engageable with the collet profile of the collets. The connector body may also include a body ring operatively coupled between the cover and the sub. The collets may have a body profile selectively engageable with the connector body. The connector body defines a collet cavity to receive the plurality of collets. The collets are movable distance from a receptacle of the cover and define a gap therebetween. The connector body has an inner surface defining a cavity to slidingly receive the piston. The piston includes a support ring on an inner surface thereof, the support ring defining a portion of the piston profile to support the collets thereon in the retracted position. The piston includes a latch ring on an inner surface thereof. The latch ring defines a portion of the piston profile to support the collets in the engaged position.

The piston includes a primary piston engageable with the collets and a secondary piston supporting the primary piston. The secondary piston is slidably movable in the connector body when the primary piston exceeds a maximum force. The piston separates a cavity in the connector body into a first variable volume chamber and a second variable volume. The first variable volume chamber and the second variable volume chamber are operatively connectable to a fluid source to selectively divert fluid therein whereby the piston is movable in the body between an upstroke position and a downstroke position. The components comprise at least two of a tubular, a casing, a riser, a wellhead, a blowout preventer, a low rise marine pump, a tubular and combinations thereof.

In another aspect, the disclosure relates to a method of connecting components of a wellsite. The wellsite has a wellbore extending into a subsurface formation. The method involves providing the wellsite connector, operatively connecting the end of the connector body to the first of the components, receiving the second of the components in the cavity of the connector body, and aligning the second of the components to the first component for connection therebetween by slidably moving the seal member in the connector body transversely to an axis thereof. The method may also involve sealingly engaging the seal member with the second of the components.

The method may also involve selectively latching the collets about the second of the components by selectively engaging the collet profile of the collets with the piston profile of the piston and the grip profile of the collets to the second of the components. The selectively latching may involve moving the piston by selectively pumping fluid into the first and second variable chambers, supporting the plurality of collets on a collet ring of the piston, pivotally moving the plurality of collets by axially moving the piston in the connector body, engaging a piston profile of the piston with a collet profile of the collets, pressing the collets against the second of the components by engaging a latch ring of the piston with the collets, retracting the collets by aligning the piston profile of the piston with the collet profile of the collets, extending the collets by misaligning the piston profile of the piston with the collet profile of the collets, selectively engaging a body portion of the collets with the connector body, and/or operatively connecting at least two of a tubular, a casing, a riser, a wellhead, a blowout preventer, a low rise marine pump, a tubular and combinations thereof.

Finally, in another aspect, the disclosure relates to a subsea connector for forming a connection between a first subsea device and a second subsea device. The connector includes a connector body having an end adapted for coupling to the first subsea device and a cavity adapted to receive a connecting member of the second subsea device. The connector also includes a seal member arranged in the cavity to provide the subsea connector with a hydrate seal when the connecting member extends through the seal member. The seal member is being floatable in a direction transverse to a longitudinal axis of the connector body in order to safely permit a predetermined range of angular misalignments between the connector body and connecting member.

The foregoing general description and the following detailed description are exemplary of the invention and are intended to provide an overview or framework for understanding the nature and character of the invention as claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION DRAWINGS

So that the above recited features and advantages can be understood in detail, a more particular description, briefly summarized above, may be had by reference to the embodiments thereof that are illustrated in the appended drawings. It is to be noted, however, that the appended drawings illustrate only typical embodiments and are, therefore, not to be considered limiting of its scope. The figures are not necessarily to scale and certain features and certain views of the figures may be shown exaggerated in scale or in schematic in the interest of clarity and conciseness.

FIGS. 1A and 1B are schematic views of an offshore wellsite having a wellsite connector connecting various components.

FIGS. 2A and 2B are vertical cross-sectional views of the wellsite connector of FIG. 1A taken along line 2-2 and shown in unlatched and latched positions, respectively.

DETAILED DESCRIPTION

Figure 1B:
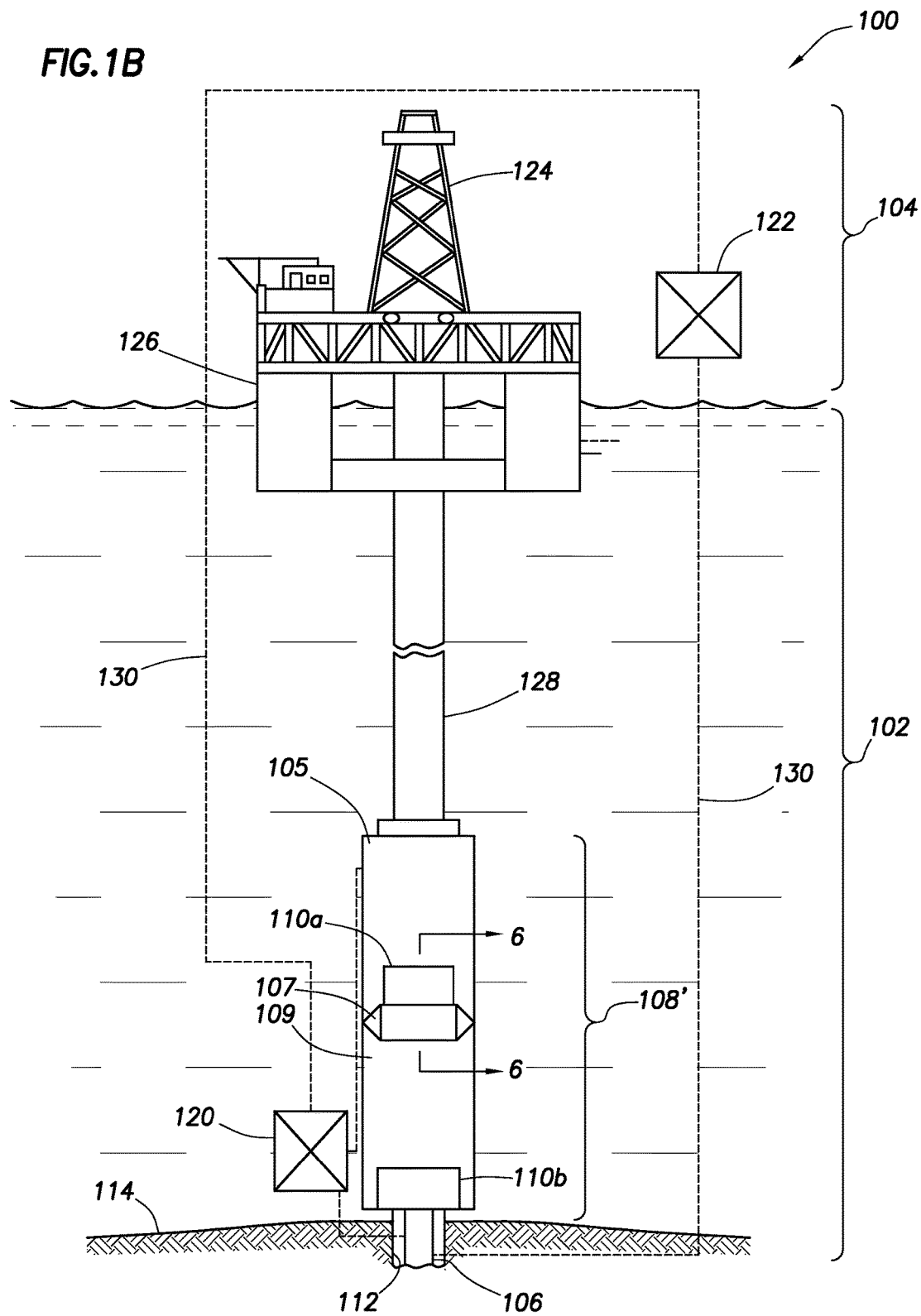

In the following detailed description, numerous specific details may be set forth in order to provide a thorough understanding of embodiments of the disclosure. However, it will be clear to one skilled in the art when embodiments of the disclosure may be practiced without some or all of these specific details. In other instances, well-known features or processes may not be described in detail so as not to unnecessarily obscure the subject matter. In addition, like or identical reference numerals may be used to identify common or similar elements.

Wellhead connectors may have a housing which slides over the wellhead. In one type, a plurality of dogs may be carried by the wellhead connector. The dogs may include grooves on their interior sides. A cam ring may move the dogs inwardly into engaging contact with grooves formed on the exterior of the wellhead. A plurality of pistons may be spaced apart from each other circumferentially around the wellhead body to move a cam ring axially between a locked and unlocked position. Alternatively, an annular piston can be used to move the cam ring. Because of the large cam ring cross-section and number of pistons, the subsea connectors may be large, heavy, and expensive to manufacture.

Certain subsea connectors may employ grip segments that are radially actuated by a piston that moves axially. For assembly of the connection, the annular piston may be above the latching dogs so that a recess in the piston is situated to allow the dogs to retract as the connection is assembled. When the annular piston is actuated, the piston may give support near the upper and the lower ends of the latching dogs that are arcuate segments nested within the annular piston.

The disclosure relates to a wellsite connector, such as connectors with a stationary upper support for the locking segments that are rotated into locking position with actuating piston movement so that a lower body profile can be used. The wellsite connector may have features, such as a fixed upper collet support with collets configured to be installed or removed without interference. The annular piston is disposed below the fixed support and is actuated axially to rotate the collets about an upper profile in the top of the wellsite connector. An initial gap between the collet and the fixed support permits the rotation. The piston height may be shorter, and, with the piston top formed to the shape of the fixed support, may also contribute to the height and associated weight reduction of the wellsite connector. A hydraulic system actuates the piston. The wellsite connector may be a land-based or subsea connector for connecting various wellsite components, such as a tubular, a casing, a riser, a wellhead, a blowout preventer, a low marine riser pump (LMRP), etc.

The subject matter seeks to provide a design that is compact, light and economical to build. The design provides a fixed upper support for latching dogs or collets in the housing separated from the piston. In the piston up position, a clearance to the fixed support combined with the piston configuration allows the collets to be held retracted at their lower end for assembly. Axial downward movement of the piston rotates the lower end of the collets to engage the mating pattern on the well tubular while moving the top of the collets to the stationary support to lock the marine riser or wellhead to the well tubular.

The overall height of the design may be reduced as no parts of the piston may need to be above the collets for assembly of the connection when the connection is fully assembled and moved onto a wellhead or a riser in the unlocked position. The collets pivot about the upper profile on assembly and space is provided adjacent the fixed support to accommodate such collet rotation without binding. The design may be configured to make installation and removal of the collets simpler, and to remove interference as the collet fingers open. These and other aspects of the present disclosure will be more readily apparent to those skilled in the art from a review of the description of the preferred embodiment and the associated drawings while recognizing that the full scope of the invention is to be found in the appended claims.

FIGS. 1A and 1B depict an offshore wellsite 100 with various connection configurations. The wellsite 100 has a subsea system 102 and a surface system 104. The wellsite 100 is described as being a subsea operation, but may be for any wellsite environment (e.g., land or water based). The subsea system 102 includes a wellhead 106 extending from a wellbore 112 in a sea floor 114, and a wellsite connection assembly 108 thereabove.

FIG. 1A shows a connection assembly 108 which includes a pair of BOPs 111, a mandrel 107, and a pair of wellsite connectors 110a,b. An upper of the pair of wellsite connectors 110a,b is depicted as connecting an upper of the pair of BOPs 111 with the mandrel 107. The mandrel 107 connects the upper wellsite connector 110a,b to a lower of the pair of BOPs 111. The lower of the pair of wellsite connectors 110a,b is depicted as connecting the lower BOP 111 to the wellhead 106.

FIG. 1B shows another connection assembly 108' which includes an LMRP 105, a mandrel 107, a lower stack 109 and a pair of wellsite connectors 110a,b. An upper of the pair of wellsite connectors 110a is depicted as connecting the LMRP 105 with the mandrel 107. A lower of the pair of wellsite connectors 110b is depicted as connecting the lower stack 109 to the wellhead 106. A subsea controller 120 is provided for operating, monitoring and/or controlling the wellsite connector(s) 110a,b, the LMRP 105, the lower stack 109 and/or other portions of the wellsite 100.

While FIGS. 1A and 1B show specific configurations, a variety of wellsite components (or devices) may be operatively connected, such as one or more tubulars, casings, risers, wellheads, blowout preventers, low marine riser pump, combinations thereof, and the like. One or more wellsite connectors may connect one or more pairs of components. One of more of the same or different component and/or connectors may be used.

The surface system 104 includes a rig 124, a platform 126 (or vessel), a riser (or tubular) 128 and a surface controller 122. The riser 128 extends from the platform 126 to the connection assemblies 108, 108' for passing fluid therethrough. Part (or all of) the riser 128 and/or wellhead 106 may pass through the connection assembly 108, 108' and provide fluid communication therebetween.

The surface controller 122 is provided for operating, monitoring and/or controlling the rig 124, platform 126 and/or other portions of the wellsite 100. As shown the surface controller 122 is at a surface location and the subsea controller 120 is at a subsea location (e.g., at the platform 126, a vessel (not shown) or offsite). However, it will be appreciated that the one or more controllers 120/122 may be located at various locations to control the surface 104 and/or the subsea systems 102. Communication links 130 may be provided for communication with various parts of the wellsite 100, such as the controllers 120/122.

Figure 2A:
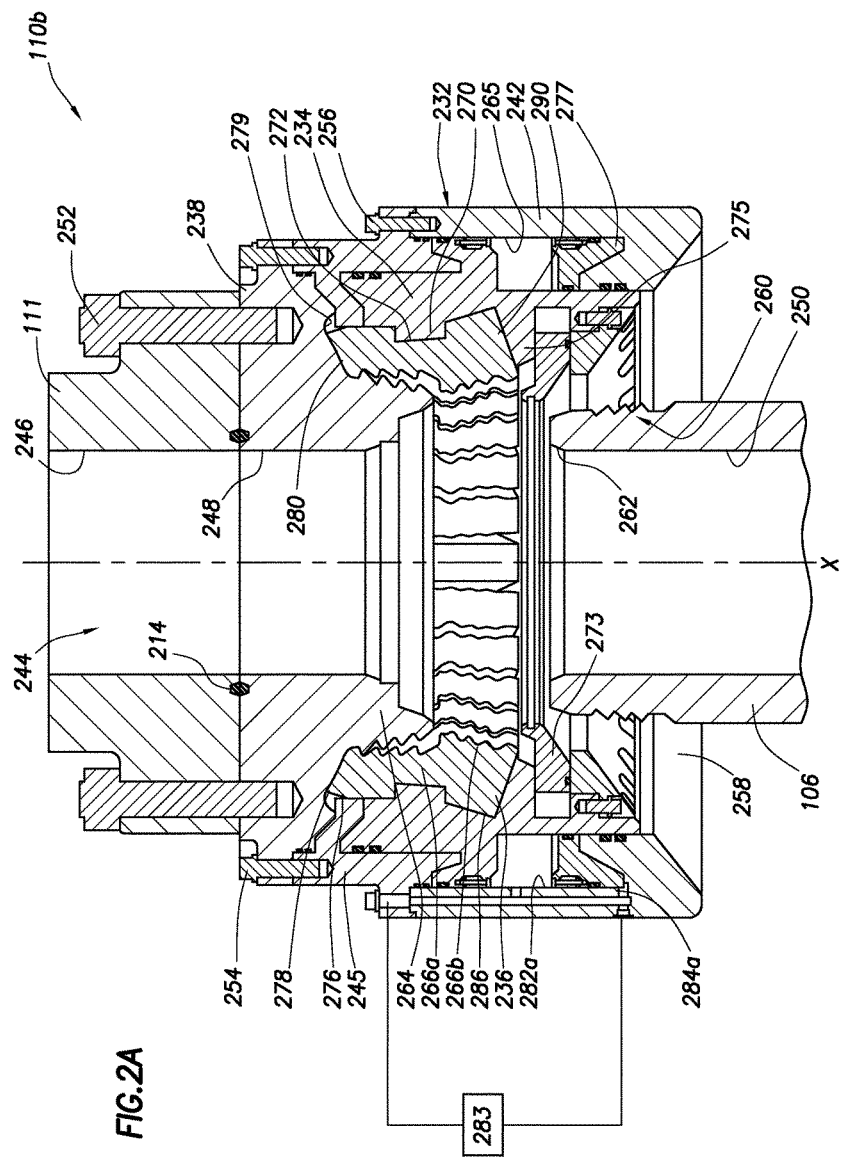
Figure 3:
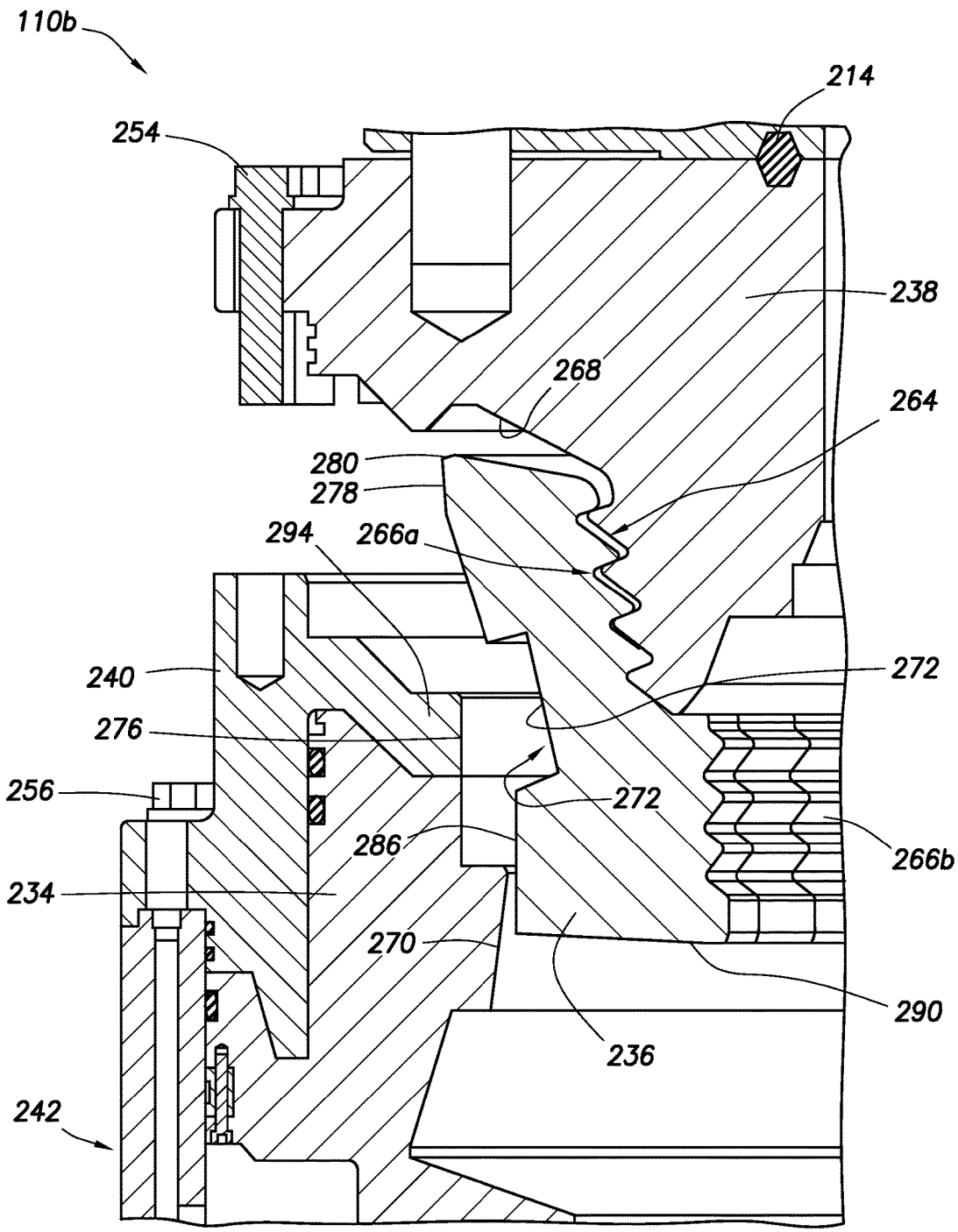
FIG. 3 is a detailed view of a portion of the wellsite connector of FIGS. 2A and 2B in an assembly position.
Figure 4:
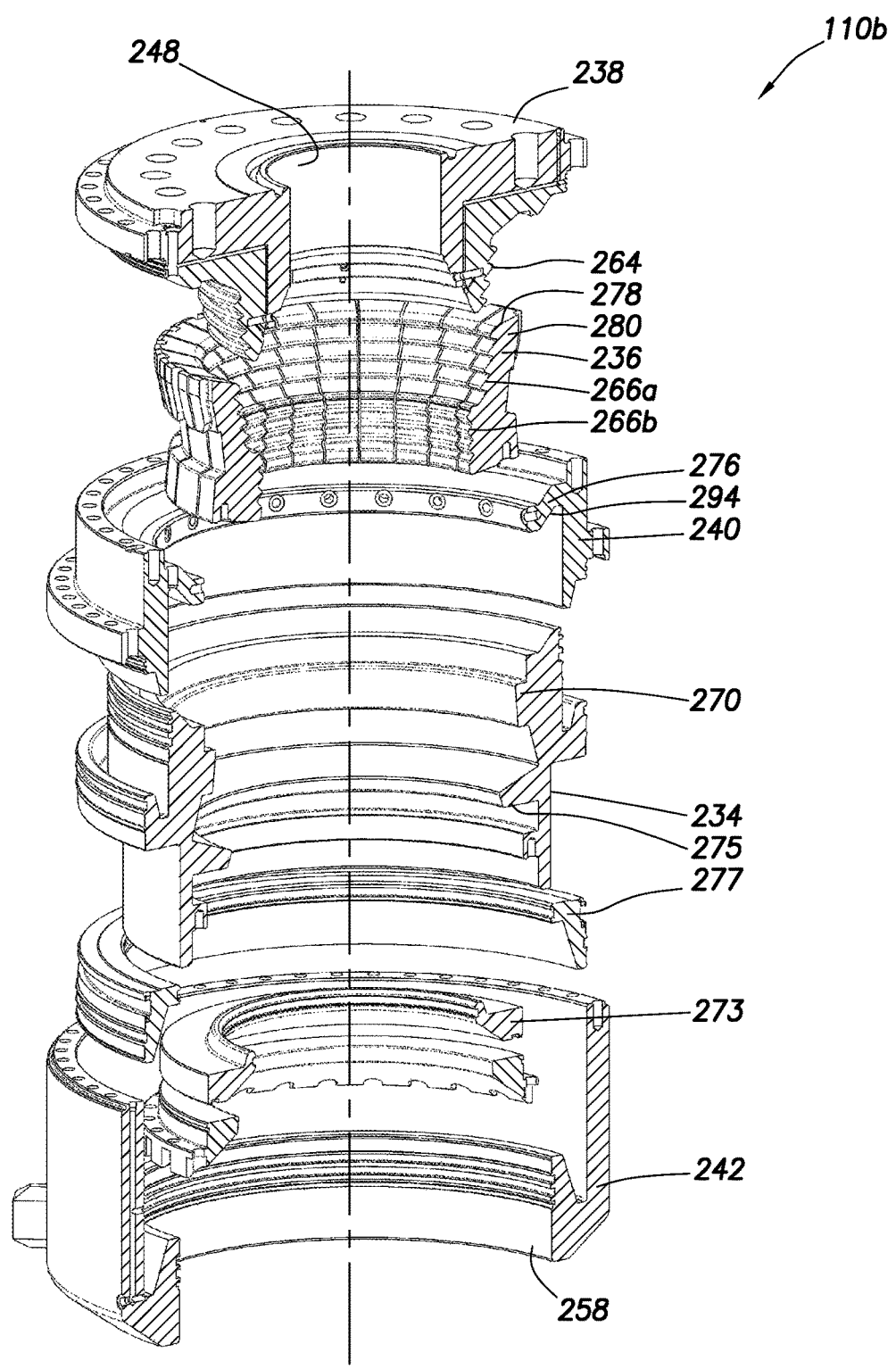
FIG. 4 is an exploded view of the wellsite connector of FIG. 2A.

FIGS. 2A-4 show various views of the wellsite connector 110b of FIG. 1A. The wellsite connector 110b as shown is a subsea connector connecting two subsea components, namely a BOP 111 and a wellhead 106. FIGS. 2A and 2B depict vertical cross-sectional views of the wellsite connector 110b in an unlatched and a latched position, respectively. FIG. 3 shows a detailed view of a portion of the wellsite connector 110b being assembled, with the upper component supported on the collets for rapid assembly. FIG. 4 shows an exploded view of the wellsite connector 110b.

The wellsite connector 110b includes a connector body 232, a piston (or annular piston or sleeve) 234, and grip collets (or locking dogs or fingers) 236. The connector body 232 includes a cover 238, a body ring 240 and a sub 242. The BOP 111 is secured with bolts 252 and sealed with seal 214 (e.g., a metal, elastomeric or other seal) to the connector cover 238. Cover 238 is secured to body ring 240 using bolts 254. Body ring 240 is secured to lower sub 242 using bolts 256. An axis X extends longitudinally through the wellsite connector 110b.

The BOP 111 has a bore 246 in fluid communication with bore 248 in the cover 238. A fluid passageway 244 extends through the wellsite connector 110b and is in communication with the bore 246 of the BOP 111, the bore 248 of the cover 238, and a bore 250 of the wellhead 106 for passage of the fluid therethrough.

The piston 234 is positioned in a cavity 265 of the connector body 232. FIG. 2A shows the piston 234 stroked up with the collets 236 in a retracted position. FIG. 2B shows the piston 234 stroked down to secure the wellsite connector 110b to the wellhead 106. In the example of FIG. 2A, the wellsite connector 110b is lowered onto a wellbore tubular 106 with the piston 234 in a raised position and collets 236 in a retracted (or disengaged) position to receive the wellhead 106. Once in position about the wellhead 106, the wellsite connector 110b may be activated to move to the latched position of FIG. 2B with the piston 234 lowered to engage the collets 236 with wellhead 106.

Lower sub 242 has an open lower end 258 that accepts a wellbore tubular, such as wellhead 106. Wellhead 106 has a wellhead profile (or threads or gripping features) 260 near its upper end 262. Grip collets 236 are an array of circumferential segments having a body profile (or threads or gripping features) 266a about an upper end thereof and a grip profile (or threads or gripping features) 266b about a lower end thereof. Body profile 266a is suspended for assembly to the body ring 240 at cover profile (or location) 264 on the cover 238 as shown in FIGS. 2B and 3. Body profile 266a is receivable at cover profile 264 about cover 238.

As shown in FIG. 3, cover profile 264 is a support location for the collets 236 during assembly. Gaps 268 occur above cover profile 264 to allow the collets 236 room to rotate radially inwardly to clear grip ring 270 that is preferably integrally formed to the piston 234. On assembly, a recess 272 will register with support ring 270 of piston 234, as shown in FIG. 2A.

A latch ring 275 is also integrally formed on the piston 234 to support the collets 236. The support ring 270 and latch ring 275 define a piston profile along an inner surface of the piston. As that occurs, the gap 268 shown in FIG. 3 will close putting the collets 236 in full registry with the surrounding annular piston 234. However, to avoid interference on assembly, there may still be a gap seen in FIG. 2A between a support surface 276 that is fixed and a part of the body ring 240. The connector body 232 defines a receptacle 279 therein about cover 238 and body ring 240 for receiving the collets 236, and surface 278 near the top 280 of the collets 236 that will ultimately be in contact when the piston 234 is actuated.

Piston 234 forms a variable volume chamber 282*a* along an inner surface of the connector body 232 in the cavity 265 between the body (or connector) ring 240 and sub 242. The variable volume chamber 282*a* may be accessed through passage 284*a* to supply hydraulic pressure from a fluid source 283 to hold the piston 234 in the FIG. 2A upper position. FIG. 2B illustrates an opposite variable volume chamber 282*b* that is accessed through passage 284*b* to apply hydraulic pressure to move the piston 234 to the FIG. 2B position.

Downward movement of piston 234 rotates the collets 236 about cover profile 264 to close the gap between surfaces 276 and 278, which in turn pushes the profiles 264 and 266*a* together while grip ring 270 rides down surface ring (or ramp) 286 of collets 236 until a surface of grip ring 270 aligns with the surface ring 286 of collet 236 to push lower end 290 of the collets 236 inwardly to lock profiles 264 and 266*a* together, as shown in FIG. 2B. A pressure energized metal gasket 273 may be provided around the wellhead 106 and the cover 238 to seal the interface between the wellhead 108 and cover 238, and thereby prevent leakage of fluids from the passageway 244. Other seal members and/or seals may be provided about the wellsite connector as described herein.

An upper end 292 of the piston 234 conforms to the shape of a fixed support 294 that extends radially from the body ring 240. Piston 234 does not need to extend above collets 236 which may reduce component height and may save weight and space while still allowing retrofit with other designs using a similar latching concept. Fixed support 294 is in a sense a cantilevered structure, and being abutted to the cover 238 gives it some additional support when the surface 278 of collet 236 presses on bearing surface 276 of the fixed support 294.

Those skilled in the art will appreciate that piston 234 can be a single annular piston or a plurality of smaller pistons each acting on a discrete collet 236. An additional backup piston 277 is shown. This additional piston may be activated as needed, for example, to move with piston 234 when additional pressure is applied to the wellsite connector.

The use of the fixed support and the conforming shape of the piston 234 may allow for a shorter piston that is in general axial alignment with the collets 236 for assembly of the connection as in FIG. 2A and for the latched operating position as in FIG. 2B. This may reduce the size of the wellsite connector 110*b*, and may make it lighter and cheaper to produce. The location of the grip profile (or support location) 266*b* and contact above that location may allow the collet lower ends 290 to swing out for assembly without interference.

On removal, the collets 236 again can retract so that they can be easily pulled with the cover 238 as illustrated in FIG. 3 for installation as well as for removal. The initial gap 268 between the upper ends 278 of the collets 236 and the bearing surface 276 along with the positioning of the grip profile 266*b* may seek to allow rapid assembly of the collets 236 and their removal without interference issues. The wellsite connector 110*b* may be lowered to the wellbore on the BOP 111 and deployed by a riser 128 to the subsea location for assembly as shown in FIGS. 1A and 3. The wellsite connector 110*b* may be pre-assembled onto the BOP 111 (and/or riser 128) for attachment to the wellhead (or tubular) 106 as shown by FIGS. 1A and 2A.

Figure 5:
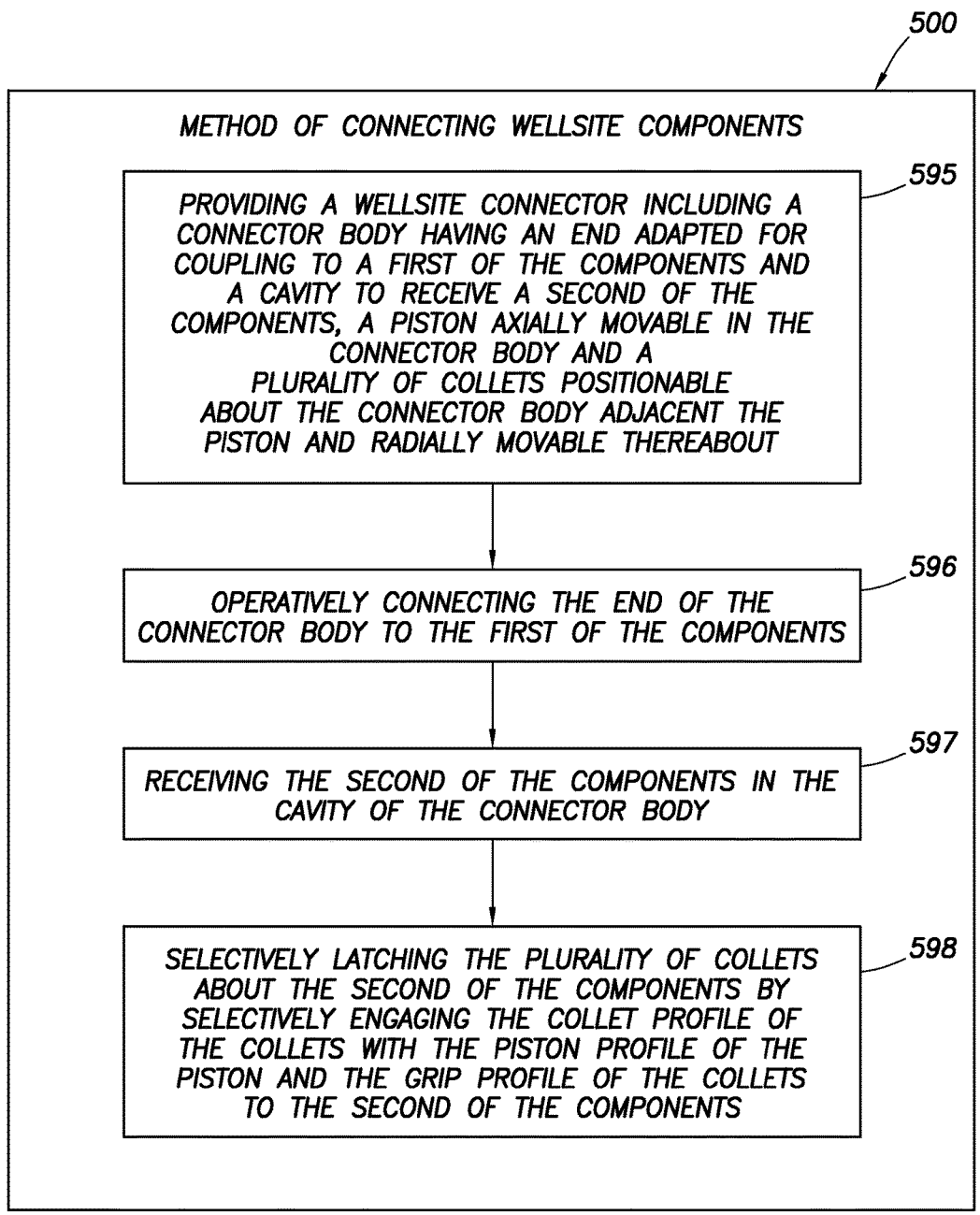
FIG. 5 is a flow chart depicting a method of connecting subsea components.

FIG. 5 shows a flow chart of a method 500 of connecting wellsite components. The method involves providing 595 a wellsite connector. The wellsite connector includes a connector body having an end adapted for coupling to a first of the components and a cavity to receive a second of the components, a piston axially movable in the connector body (the piston having a piston profile along an inner surface thereof), and a plurality of collets positionable about the body adjacent the piston and radially movable thereabout. The collets are positionable about the connector body adjacent the piston and radially movable thereabout, have a collet profile along an outer surface thereof corresponding to the piston profile of the piston, and a grip profile along an inner surface thereof selectively engageable with the second of the components. The method also involves 596 operatively connecting the end of the connector body to a first of the components, 597 receiving a second of the components in the cavity of the connector body, and 598 selectively latching the plurality of collets about the second of the components by selectively engaging the collet profile of the collets with the piston profile of the piston and the grip profile of the collets to the second of the components.

The piston may separate a cavity in the connector body into first and second variable volume chambers, and the selectively latching may involve moving the piston by selectively pumping fluid into the first and second variable chambers. The selectively latching may involve supporting the plurality of collets on a collet ring of the piston, pivotally moving the plurality of collets by axially moving the piston in the connector body, engaging a piston profile of the piston with a collet profile of the collet, pressing the plurality of collets against the second of the components by engaging a latch ring of the piston with the plurality of collets, retracting the plurality of collets by aligning the piston profile of the piston with the collet profile of the plurality of collets, extending the plurality of collets by misaligning the piston profile of the piston with the collet profile of the plurality of collets, and/or operatively connecting at least two of a tubular, a casing, a riser, a wellhead, a blowout preventer, a low marine riser pump, and combinations thereof. The method may also involve selectively engaging a body portion of the plurality of collets with the connector body.

The wellsite connector may also include the floatable seal member including the flexible ring having the hole therethrough to sealingly receive the second of the components (the seal member slidably movable in the connector body transversely to an axis thereof). The method may also involve aligning the second of the components to the first of the components for connection therebetween by slidably moving the seal member in the connector body transversely to an axis thereof. The steps may be performed in any order, and repeated as desired.

In another aspect, the disclosure relates to a subsea connector for forming a connection between a first subsea device and a second subsea device. The subsea connector comprises a connector body having an end adapted for coupling to the first subsea device and a cavity adapted to receive a connecting member of the second subsea device.

A seal member is arranged in the cavity to provide the subsea connector with a hydrate seal when the connecting member extends through the seal member. The seal member is floatable in a direction transverse to a longitudinal axis of the connector body in order to safely permit a predetermined range of angular misalignments between the connector body and the connecting member.

A subsea connector for forming a connection between a first subsea device and a second subsea device includes a connector body having an end adapted for coupling to the first subsea device and a cavity adapted to receive a connecting member of the second subsea device. A seal member is arranged in the cavity to provide the subsea connector with a hydrate seal when the connecting member extends through the seal member. The seal member is floatable in a direction transverse to a longitudinal axis of the connector body in order to safely permit a predetermined range of angular misalignments between the connector body and connecting member. The subsea connector may be a subsea or land-based wellsite connector for connecting various wellsite components, such as a tubular, a casing, a riser, a wellhead, a blowout preventer, a low rise marine pump, etc.

Figure 6A:
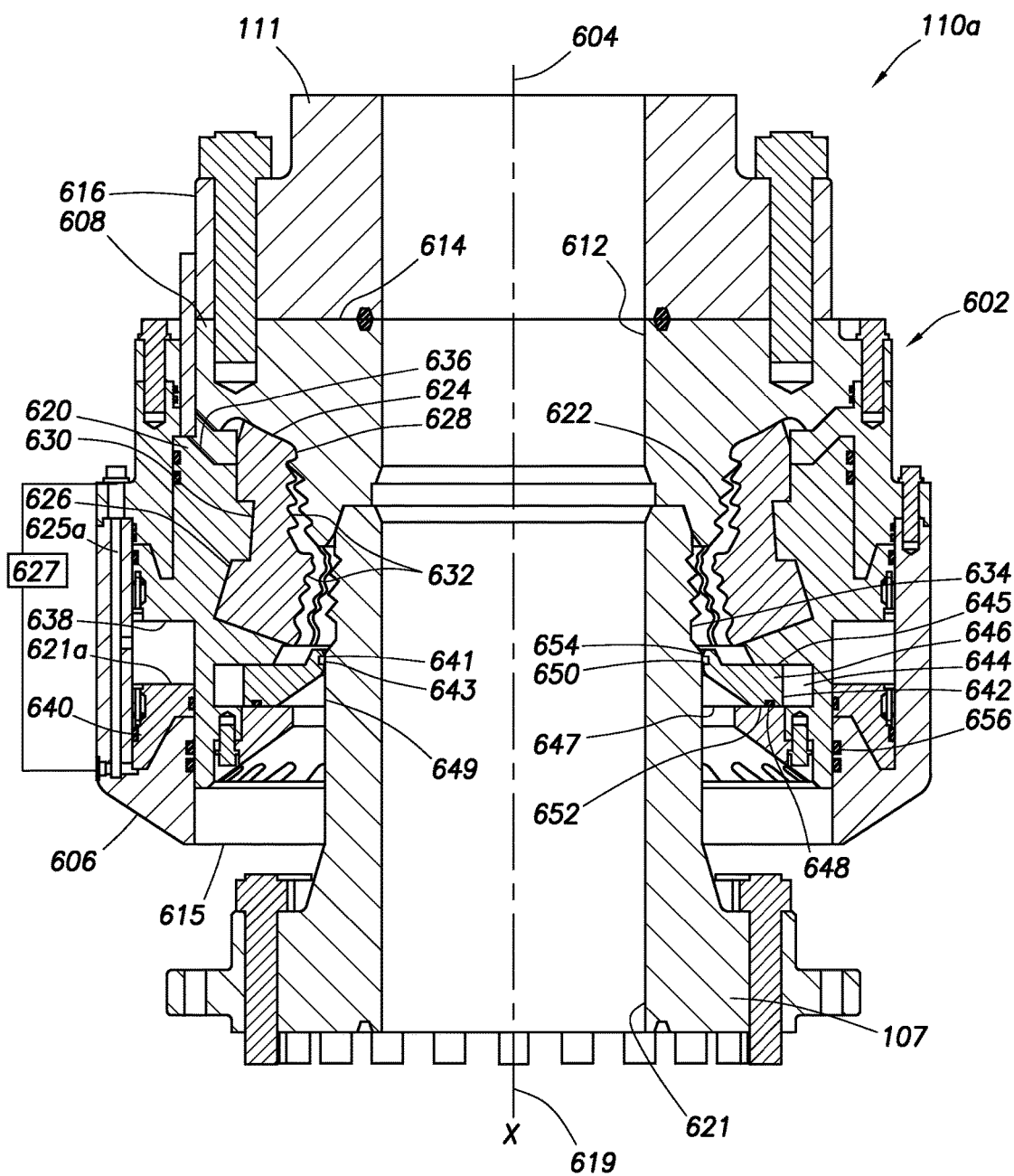
FIG. 6A-6C are cross-sectional views of the wellsite connector of FIG. 1A taken along line 6-6 in an unlocked state, an unlocked and misaligned state, and a locked state, respectively.
Figure 6B:
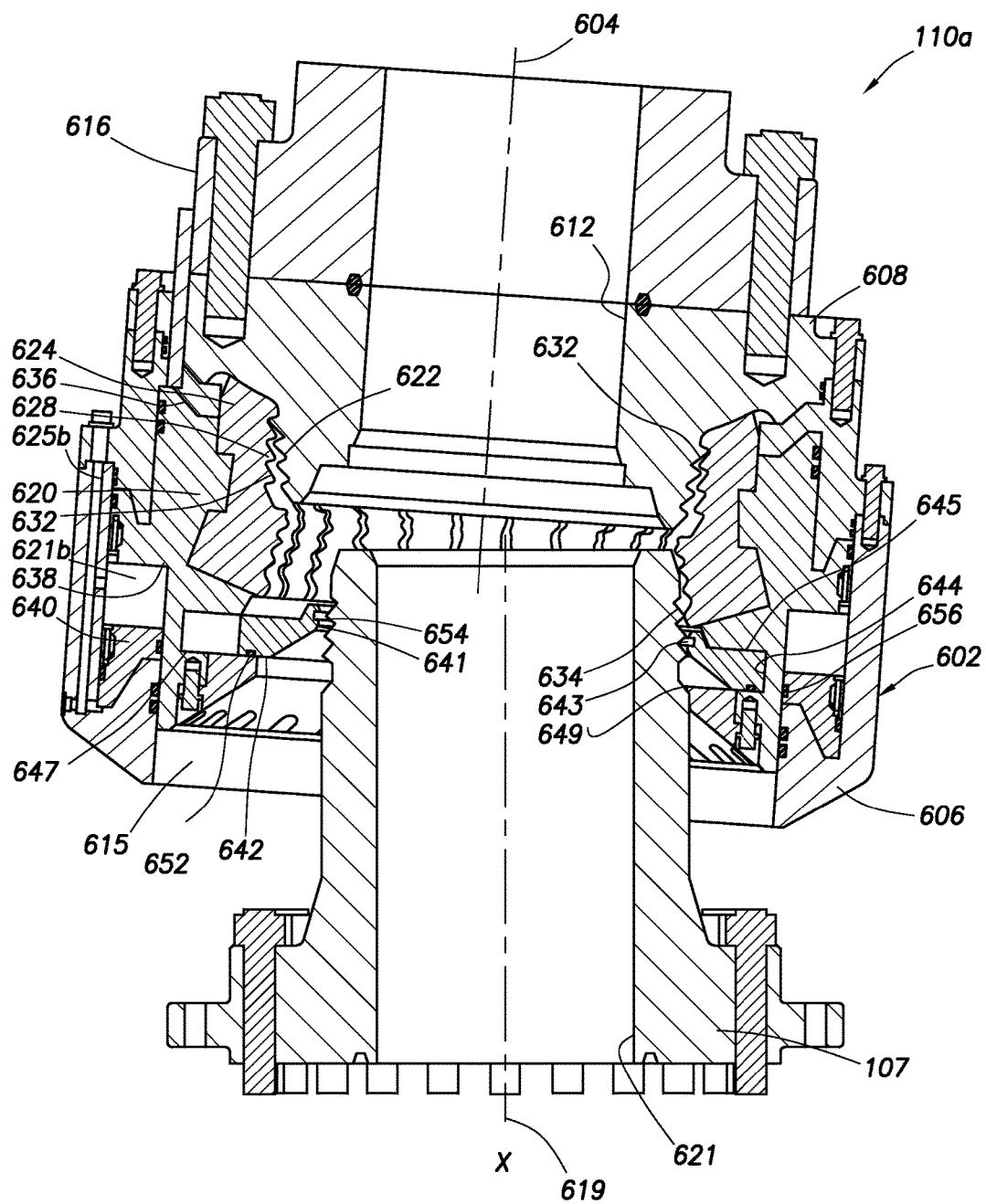
Figure 6C:
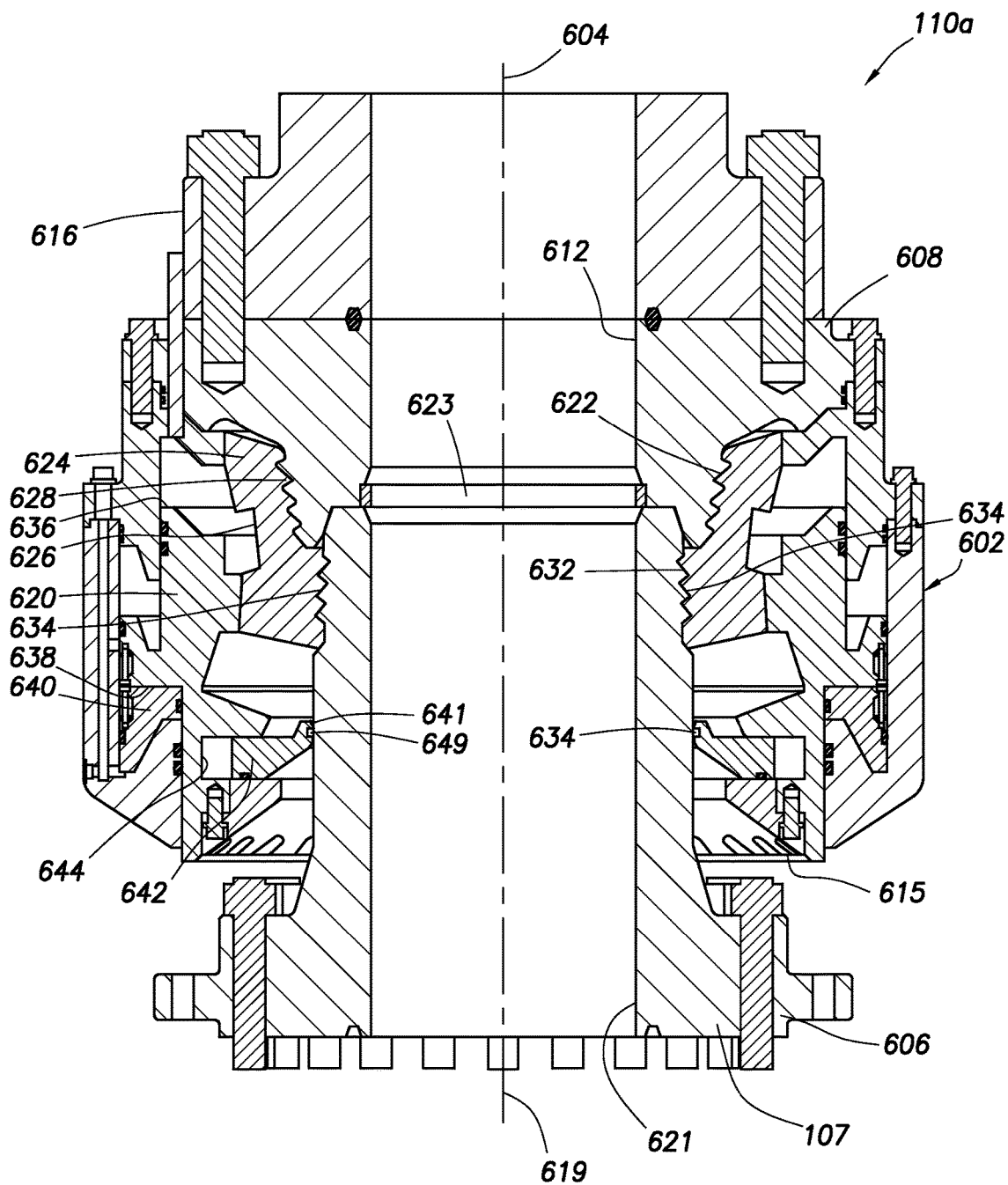

FIGS. 6A-6C show various views of another wellsite (or subsea) connector 110a. The wellsite connector 110a as shown is a subsea connector connecting two subsea components, namely the BOP 111 and mandrel 107 of FIG. 1B. FIGS. 6A-6C depict vertical cross-sectional views of the wellsite connector 110a in an unlatched, an unlatched misaligned, and a latched position, respectively. Features of the connector 110b of FIGS. 2A-5 may be used with the connector 110a, and vice versa.

The subsea connector 110a has a connector body 602 having a longitudinal (or axial) axis 604. The connector body 602 has a connector base (or sub) 606 and a connector head (or cover) 608. A cavity 615 is defined in the connector base 606, and the connector head 608 extends partially into the cavity 615. A bore 612 defined in the connector head 608 extends from a top end 614 of the connector head 608 to the cavity 615.

A connecting flange 616 of a first subsea device (e.g., BOP 111) is fastened to the connector head 608, and the connecting mandrel 107 of a second subsea device (e.g., another BOP 111) and is partially received in the cavity 615. To form a connection between the first subsea device and the second subsea device, the connecting mandrel 107 can be locked to the connector body 602 using a suitable locking mechanism, an example of which will be described below.

The subsea connector 110a has an unlocked state, as shown, for example, in FIGS. 6A and 6B, where the connecting mandrel 107 is not locked to the connector body 602. The subsea connector 110a also has a locked state, as shown in FIG. 6C, where the connecting mandrel 107 is locked to the connector body 602. In the locked state, the first subsea device and the second subsea device are joined together by the subsea connector 110a. In the unlocked state, the first subsea device and the second subsea device are not joined together by the subsea connector 110a.

When the subsea connector 110a is in the locked state, as shown in FIG. 6C, the longitudinal axis 619 of the connecting mandrel 107 is aligned with the longitudinal axis 604 of the connector body 602. Also, a bore 621 of the connecting mandrel 107 is aligned with a bore 612 of the connector head 608, which would allow passage of tools and fluids through the subsea connector 110a. A gasket 642 (e.g., a pressure energized metal gasket) may be provided around the connecting mandrel 107 and the connector head 608 to seal the interface between the connecting mandrel 107 and the connector head 608, and thereby prevent leakage of fluids from the aligned bores 612, 621 into the cavity 615 as shown in FIG. 6C.

While the subsea connector 110a is transitioning between the locked state and unlocked state, the connecting mandrel 107 or the connector body 602 may assume various tilted positions, which would lead to angular misalignment between the longitudinal axes 604, 619 of the connector body 602 and connecting mandrel 107, respectively. Angular misalignment between the longitudinal axes 604, 619 may also be expressed simply as angular misalignment between the connector body 602 and connecting mandrel 107. FIG. 6B shows an example of angular misalignment between the connecting mandrel 107 and connector body 602. The cavity 615 is larger in diameter than the connecting mandrel 107 to allow for this angular misalignment between the connector body 602 and the connecting mandrel 107.

Returning to FIG. 6A, an annular piston (or sleeve) 620 is arranged in the cavity 615 and is movable by fluid pressure differential in a direction generally parallel to the longitudinal axis 604. The connector head 608 has a locking surface (or cover profile or location) 622 disposed radially about the bore 612. A plurality of radial locking dogs (or collets or fingers) 624 is disposed between the piston 620 and the locking surface 622. Each of the locking dogs 624 has a face (or collet profile) 630 that opposes a piston profile of the piston 620, and a face (or cover profile) 628 that opposes the connector head locking surface 622. The face 626 includes a wedge (part of a collet) profile 630 that is designed to engage a mating wedge (or piston) profile on the piston 620.

The face 628 includes gripping features 632 such as teeth. The gripping features 632 in an upper portion (or body profile) of the face 628 are designed to engage the connector head locking surface 622. The gripping features 632 in a lower portion (or grip profile) of the face 628 are designed to engage a locking surface 634 on the connecting mandrel 107. The locking surfaces 622, 634 each have gripping features for locking engagement with the gripping features 632 on the face 628 of the locking dogs 624.

Returning to FIGS. 6A and 6B, piston 620 separates cavity 615 into variable volume chambers 621a,b along an inner surface of the connector body 602. The chambers 621a,b are defined within the cavity 615, between the connector base 606 and the piston 620. The chambers 621a,b may be accessed through passage 625a,b to supply hydraulic pressure from a fluid source 627 to hold the piston 620 in the FIG. 6A upper position or the FIG. 6C down position.

The subsea connector 110a may also be transitioned to the locked state by applying fluid pressure to an upper area 636 of the piston 620 so that the piston 620 moves downwardly and tilts the locking dogs 624 inwardly and into engagement with both locking surfaces 622, 634 (FIG. 6C shows the locking dogs 624 fully engaged with the locking surfaces 622, 634). The subsea connector 110a is unlocked by applying fluid pressure to a lower area 638 of the piston 620 so that the piston 620 moves upwardly and tilts the locking dogs 624 outwardly and away from the locking surfaces 632, 634.

Within the cavity 615 is an auxiliary annular piston (or sleeve) 640. Pressure differential across the piston 640 may be used to further urge the locking piston 620 upwardly, in a direction generally parallel to the longitudinal axis 604 of the connector body 602, if needed. While the subsea connector 110a is transitioning to the unlocked state, either or both of the connecting mandrel 107 and connector body 602 may tilt and shift so that the connector body 602 and the connecting mandrel 107 become angularly misaligned. This is shown, for example, in FIG. 6B.

Returning to FIG. 6A, a floatable seal member (or gasket) 642 is disposed in an annular retaining pocket 644 in the piston 620. The seal member 642 may be a metal or elastomeric member that provides a seal at an interface between the subsea connector 110a and the connecting mandrel 107. The seal provided by the seal member 642 is not required to contain pressure. The seal member 642 may provide a hydrate seal that keeps hydrates from collecting and solidifying within the cavity 615, particularly around the surfaces in the cavity 615 that are or may be exposed to seawater, such as surfaces of the locking dogs 624 and/or piston 620.

The seal member 642 may work as a one-way valve that prevents migration of gas into the cavity 615 while the subsea connector 110a is in use. The seal member 642 may also be used to contain fluid, such as glycol, injected into the cavity 615 to dissolve possible hydrate buildup within the cavity 615. The seal member 642 has a seal ring 646, which has a lip 641 defining an opening 643. When the connecting mandrel 107 is received in the opening 643, the lip 641 circumscribes and engages a sealing area 649 of the connecting mandrel 107. The sealing area 649 may be below the mandrel locking surface 634. The outer diameter of the connecting mandrel 107 at the locking surface 634 may be smaller than the outer diameter of the connecting mandrel 107 at the sealing area 649 so that the lip 641 does not engage the locking surface 634. FIGS. 6A and 6B show the seal member 642 engaging the connecting mandrel 107 at various positions on the sealing area 649.

Returning to FIG. 6A, the upper and lower walls 645, 647 of the retaining pocket 644 constrain the seal member 642 to float, i.e., move freely, in a direction that is transverse to the connector body longitudinal axis 604. The floating seal member 642 may be used to prevent damage to the subsea connector 110a or connecting mandrel 107 when there is angular misalignment between the connector body 602 and the connecting mandrel 107 and the connecting mandrel 107 extends through the opening 643. This angular misalignment may happen when transitioning the subsea connector 110a from the locked state to the unlocked state.

As shown in FIGS. 1A and 1B, connection assembly 108' is connected to a rig at the surface. The rig may be up to 5 degrees off location vertically from the subsea stack, which may induce misalignment between the connector body 602 and the connecting mandrel 107 if the subsea connector 110a is used for connection in the subsea stack. Severe misalignment may occur, for example, at subsea connections in the LMRP because the LMRP may initially pivot off of the stack frame before liftoff. The pivot may be up to 40 inches (101.6 cm) above or below the top of the connecting mandrel 107.

The floating capability of the seal member 642 may safely permit even severe misalignment. As an example, FIG. 6B shows the seal member 642 floated to the right side of the subsea connector 110a in order to accommodate an upward tilt of the connector body 602 relative to the connecting mandrel 107. The allowable travel length of the seal member 642 in a direction transverse to the longitudinal axis 619 may determine the range of angular misalignments that can be safely permitted by the floating capability of the seal member 642. The allowable travel length of the seal member 642 can be selected based on a typical range of angular misalignments expected between the connector body 602 and connecting mandrel 107.

In one embodiment, the retaining pocket 644 is formed in the piston 620, which would make the seal member 642 move with the piston 620 as the piston 620 responds to fluid pressure differential. It is possible to locate the retaining pocket 644 elsewhere, such as in the wall of the connector base 606 or in another structure arranged within the cavity 615, as long as the seal member 642 located in the retaining pocket 644 is able to provide a seal at an interface between the subsea connector 110a and the connecting mandrel 107.

As explained above, the seal member 642 has a floating motion in a direction transverse to the connector body longitudinal axis 604. The seal member 642 also experiences motion in other directions due to being retained in the pocket 644. For example, the seal member 642 may move in a direction generally parallel to the connector body longitudinal axis 604 as the piston 620 in which the pocket 644 is formed moves. The seal member 642 may also experience tilting and shifting motions due to tilting and shifting of the connector body 602, e.g., when transitioning between the locked and unlocked states of the subsea connector 110a.

The seal ring 646 has a bottom seal ring face 648 and a side seal ring face 650. The side seal ring face 650 is located on the lip 641. The bottom seal ring face 648 faces the bottom wall 647 of the retaining pocket 644 and is arranged to seal against the bottom wall 647 of the retaining pocket 644. The side seal ring face 650 faces a center of the connector body 602 and is arranged to engage and seal against the connecting mandrel 107 when the connecting mandrel 107 is received in the opening 643 defined by the lip 641.

In one embodiment, the seal ring faces 648, 650 carry sealing elements 652, 654, respectively, such as elastomer seals. In another embodiment, one or both of the seal ring faces 648, 650 may not carry sealing elements and may be sealing surfaces, such as elastomeric or metallic sealing surfaces. Additional sealing elements 656, such as elastomer seals, may be provided between the connector base 606 and the piston 620. The sealing elements 656 may be carried by the connector base 606 so that they provide the necessary sealing regardless of the position of the piston 620 within the cavity 615. The additional sealing elements 656 may be pressure-sealing elements.

Figure 7:
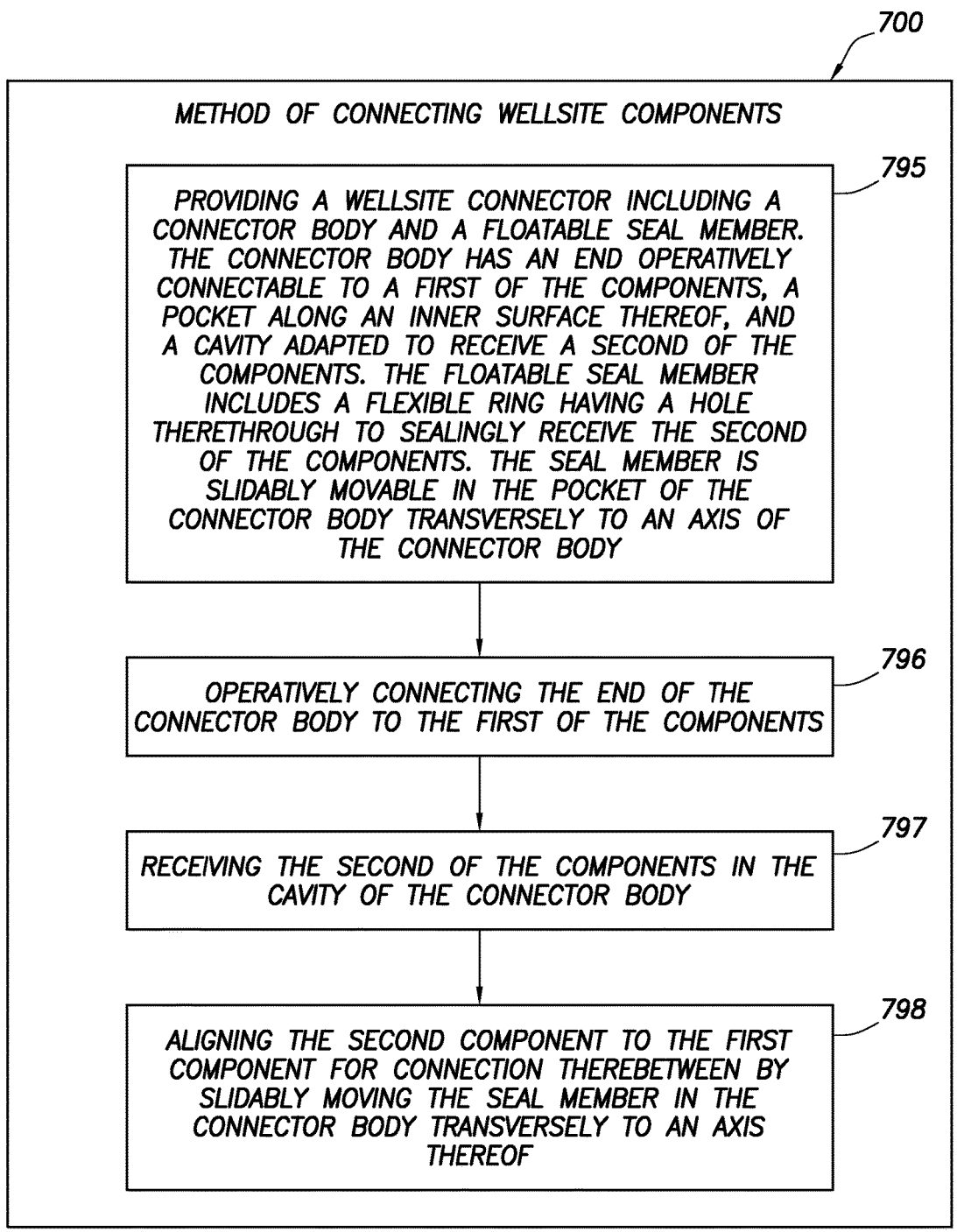
FIG. 7 is a flow chart depicting another method of connecting subsea components.

FIG. 7 shows a flow chart of another method 700 of connecting wellsite components. The method involves providing 795 a wellsite connector. The wellsite connector includes a connector body and a floatable seal member. The connector body has an end operatively connectable to a first of the components, a pocket along an inner surface thereof, and a cavity adapted to receive a second of the components. The floatable seal member includes a flexible ring having a hole therethrough to sealingly receive the second of the components. The seal member is slidably movable in the pocket of the connector body transversely to an axis of the connector body. The method further involves 796—operatively connecting the end of the connector body to the first of the components, 797—receiving the second of the components in the cavity of the connector body, and 798 aligning the second of the components to the first of the components for connection therebetween by slidably moving the seal member in the connector body transversely to an axis thereof.

Features of the method of FIG. 5 may also be included. The method may be performed in any order and repeated as desired.

While the subject matter has been described with respect to a limited number of embodiments, those skilled in the art, having benefit of this disclosure, will appreciate that other embodiments can be devised which do not depart from the scope of the subject matter as disclosed herein. Accordingly, the scope of the invention should be limited only by the attached claims.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

The above description is illustrative of the preferred embodiment and many modifications may be made by those skilled in the art without departing from the invention whose scope is to be determined from the literal and equivalent scope of the claims that follow.

While the embodiments are described with reference to various implementations and exploitations, it will be understood that these embodiments are illustrative and that the scope of the inventive subject matter is not limited to them. Many variations, modifications, additions and improvements are possible. For example, one or more wellsite connectors and/or components may be connected. The wellsite connectors are shown in a specific orientation, but one or more could be inverted for coupling between one or more components as desired.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A well site connector for connecting components of a well site, the well site having a wellbore extending into a subsurface formation, the well site connector comprising:
a connector body having an axis, an end adapted for coupling to a first of the components, and a cavity adapted to receive a second of the components;
a piston axially movable in the connector body, the piston having an annular pocket along an inner surface thereof; and
a floatable seal member comprising a seal ring having a hole therethrough to sealingly receive the second of the components, the seal member slidably movable in the pocket of the piston transversely relative to the axis of the connector body whereby the second of the components is alignable to the first of the components for connection therebetween and is receivable within the inner surface of the piston;
wherein the piston is configured to provide a radial gap between the inner surface of the piston and the second of the components when the second of the components is received within the cavity of the connector body; and
wherein the radial gap extends axially from an end of the piston to the floatable seal member.

2. The wellsite connector of claim 1, wherein the floatable seal member has a lip extending from the seal ring and a tapered surface extending from the lip and tapering away from the axis;
wherein the lip has a seal ring face sealingly engageable with the second of the components; and
wherein the radial gap extends between the tapered surface of the seal ring and the second of the components when the lip seals around the second of the components.

3. The wellsite connector of claim 2 further comprising:
a plurality of collets received along the inner surface of the piston axially spaced apart from the annular pocket and adapted to engage the second of the components;
wherein the seal member has radially-extending top and bottom seal ring surfaces supported by radially-extending top and bottom walls of the pocket; and
wherein the lip extends axially opposite the bottom wall of the pocket and beyond the top wall of the pocket, toward the plurality of collets.

4. The wellsite connector of claim 2, wherein the seal member has top and bottom seal ring surfaces supported by top and bottom walls of the pocket; and
wherein the lip extends axially beyond the top wall of the pocket.

5. The wellsite connector of claim 4 wherein the bottom wall of the pocket extends radially inward further than the top wall of the pocket; and
wherein the radial gap is disposed between the bottom wall of the pocket and the second of the components when the second of the components is received in the wellsite connector.

6. The wellsite connector of claim 1 further comprising a seal element positionable in a cavity of the seal member.

7. The wellsite connector of claim 1, wherein a portion of the cavity is larger in diameter than the second of the components to allow angular misalignment between the connector body and the second of the components.

8. The wellsite connector of claim 1, wherein the pocket extends about the inner surface of the piston.

9. The wellsite connector of claim 1, further comprising a plurality of collets positionable about the connector body adjacent the piston and radially movable thereabout, the plurality of collets having a collet profile along an outer surface thereof corresponding to a piston profile along the inner surface of the piston and the plurality of collets having a grip profile along an inner surface thereof selectively engageable with the second of the components whereby the plurality of collets are selectively latchable about the second of the components.

10. The wellsite connector of claim 9, wherein the connector body comprises a cover operatively connectable to the first of the components and a sub having a hole therethrough to receive the second of the components.

11. The wellsite connector of claim 10, wherein the cover has a cover location thereon engageable with the collet profile of the plurality of collets.

12. The wellsite connector of claim 10, wherein the connector body further comprises a body ring operatively coupled between the cover and the sub.

13. The wellsite connector of claim 9, wherein the plurality of collets have a body profile selectively engageable with the connector body; and
wherein the connector body defines a collet cavity to receive the plurality of collets.

14. The wellsite connector of claim 13, wherein the plurality of collets are axially disposed between the pocket of the piston and the end of the connector body within the collet cavity.

15. The wellsite connector of claim 14, wherein the plurality of collets is disposed at a movable distance from a receptacle of the connector body and define a gap therebetween.

16. The wellsite connector of claim 9, wherein the piston has a support ring on the inner surface thereof, the support ring defining a portion of the piston profile to support the plurality of collets thereon in a retracted position.

17. The wellsite connector of claim 9, wherein the piston has a latch ring on the inner surface thereof, the latch ring defining a portion of the piston profile to support the plurality of collets in an engaged position.

18. The wellsite connector of claim 1, wherein an inner surface of the connector body slidingly receives the piston.

19. The wellsite connector of claim 1, wherein the piston comprises a primary piston and a secondary piston supporting the primary piston, the secondary piston slidably movable in the connector body when the primary piston exceeds a maximum force.

20. The wellsite connector of claim 1, wherein the piston separates the cavity in the connector body into a first variable volume chamber and a second variable volume chamber.

21. The wellsite connector of claim 20, wherein the first variable volume chamber and the second variable volume chamber are operatively connectable to a fluid source to selectively divert fluid therein whereby the piston is movable in the connector body between an upstroke position and a downstroke position.

22. The wellsite connector of claim 1, wherein the components comprise at least two of a tubular, a casing, a riser, a wellhead, a blowout preventer, a low rise marine pump, a tubular and combinations thereof.

23. A method of connecting components of a wellsite, the wellsite having a wellbore extending into a subsurface formation, the method comprising:
providing a wellsite connector comprising:
a connector body having an axis, an end adapted for coupling to a first of the components, and a cavity adapted to receive a second of the components;
a piston axially movable in the connector body, the piston having a pocket along an inner surface thereof; and
a floatable seal member comprising a seal ring having a hole therethrough to sealingly receive the second of the components, the seal member slidably movable in the pocket of the piston transversely relative to the axis of the connector body;
operatively connecting the end of the connector body to the first of the components;
receiving the second of the components within the cavity of the connector body, and within the hole of the seal ring, and within the inner surface of the piston;
aligning the second of the components to the first of the components for connection therebetween;
slidably moving the seal member in the connector body transversely relative to the axis of the connector body; and
forming a radial gap between the inner surface of the piston and the second of the components, wherein the radial gap extends axially from an end of the piston to the floatable seal member.

24. A subsea connector for forming a connection between a first subsea device and a second subsea device, comprising:
a connector body having a longitudinal axis, a coupling end coupled to the first subsea device and a cavity end expandable to define a variable diameter cavity to receive a connecting member of the second subsea device;
a piston that is axially movable within the connector body, wherein the piston includes a pocket extending into an inner surface of the piston along a direction transverse to the longitudinal axis of the connector body; and
an annular seal member disposed within the pocket of the piston and positioned about an inner surface of the cavity end to provide the subsea connector with a hydrate seal when the connecting member extends through the seal member, the seal member being floatable within the pocket in the radial direction;
wherein the seal member has radially-extending top and bottom seal ring surfaces supported by the top and bottom walls of the pocket; and
wherein the bottom wall of the pocket extends radially inward further than the top wall of the pocket.

25. The subsea connector of claim 24, wherein the seal member is configured to maintain contact with the connecting member over a predetermined range of angular misalignments between the longitudinal axis of the connector body and the longitudinal axis of the connecting member.

26. The subsea connector of claim 25, wherein the cavity receives slidingly the piston; and
wherein an inner surface of the piston is configured to receive the second subsea device; and
wherein a radial gap extends axially from an end of the piston to the seal member to permit predetermined range of angular misalignments while the subsea connector transitions between a locked and an unlocked state.

27. The subsea connector of claim 24 further comprising a plurality of collets received along the inner surface of the piston axially spaced apart from the pocket and the seal member and adapted to engage the second of the components.

28. The subsea connector of claim 24 wherein the floatable seal member has an annular lip extending from the seal ring, the lip having a face that is sealingly engageable with the second of the components; and
wherein the lip extends axially beyond the top wall of the pocket and extends radially-inward beyond the end of the top wall of the pocket.

* * * * *